(12) United States Patent
Negishi et al.

(10) Patent No.: US 9,951,180 B2
(45) Date of Patent: Apr. 24, 2018

(54) ULTRAVIOLET-RAY-ABSORBING POLYCARBONATE

(71) Applicant: ADEKA CORPORATION, Tokyo (JP)

(72) Inventors: Yoshinori Negishi, Saitama (JP); Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 11 days.

(21) Appl. No.: 15/025,062

(22) PCT Filed: Sep. 29, 2014

(86) PCT No.: PCT/JP2014/075936
§ 371 (c)(1),
(2) Date: Mar. 25, 2016

(87) PCT Pub. No.: WO2015/050087
PCT Pub. Date: Apr. 9, 2015

(65) Prior Publication Data
US 2016/0229954 A1  Aug. 11, 2016

(30) Foreign Application Priority Data

Oct. 2, 2013  (JP) ................ 2013-207595

(51) Int. Cl.
*C08G 64/14* (2006.01)
*C08G 64/28* (2006.01)
(Continued)

(52) U.S. Cl.
CPC ............. *C08G 64/12* (2013.01); *C08G 64/14* (2013.01); *C08G 64/28* (2013.01); *C08L 69/00* (2013.01); *C08L 2201/08* (2013.01)

(58) Field of Classification Search
None
See application file for complete search history.

(56) References Cited

U.S. PATENT DOCUMENTS

| 4,153,780 A | 5/1979 | Narita et al. |
| 4,952,664 A | 8/1990 | Masumoto et al. |

(Continued)

FOREIGN PATENT DOCUMENTS

| JP | 49-99596 | 9/1974 |
| JP | 1-201330 A | 8/1989 |

(Continued)

OTHER PUBLICATIONS

Chinese Office Action and Search Report, dated Oct. 9, 2016, for Chinese Application No. 201480054778.9.

(Continued)

*Primary Examiner* — Tae H Yoon
(74) *Attorney, Agent, or Firm* — Birch, Stewart, Kolasch & Birch, LLP

(57) ABSTRACT

Provided is an ultraviolet-absorbing polycarbonate which exhibits excellent heat resistance as well as excellent weather resistance without showing a reduction in its performance or contaminating a processing facility during processing.
The ultraviolet-absorbing polycarbonate is represented by the following Formula (1):

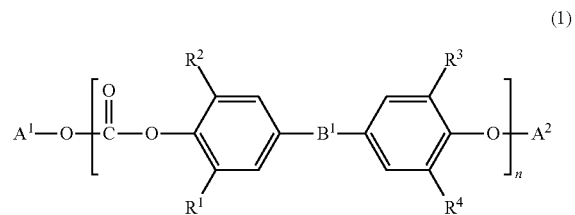

(1)

[wherein, n represents an integer of 2 to 300; $B^1$ represents a linear or branched alkylidene group having 2 to 10 carbon atoms or the like; $R^1$ to $R^4$ each independently represent a hydrogen atom or the like; and $A^1$ and $A^2$ each independently represent a group represented by the following Formula (2), (3) or the like:

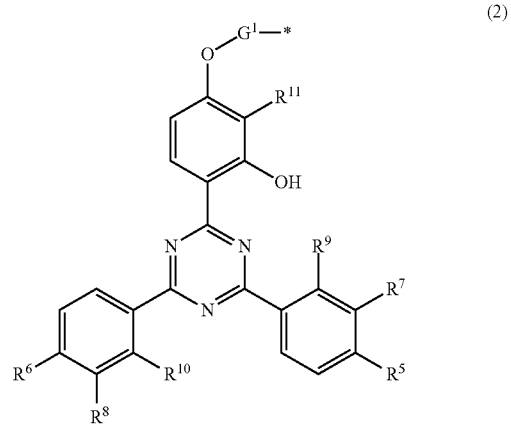

(2)

(wherein, $G^1$ represents a linear or branched alkylene group having 1 to 18 carbon atoms or the like; $R^5$ to $R^8$ each represent a linear or branched alkyl group having 1 to 12 carbon atoms or the like; $R^9$ and $R^{10}$ each represent a linear or branched alkyl group having 1 to 12 carbon atoms or the like; and $R^{11}$ represents a hydrogen atom or the like)

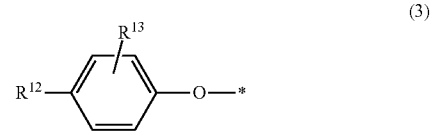

(3)

(wherein, $R^{12}$ and $R^{13}$ each represent a hydrogen atom or the like)].

5 Claims, No Drawings

(51) Int. Cl.
    *C08L 69/00*     (2006.01)
    *C08G 64/12*     (2006.01)

(56) References Cited

U.S. PATENT DOCUMENTS

| | | | |
|---|---|---|---|
| 5,736,597 | A | 4/1998 | Birbaum et al. |
| 7,235,611 | B2 * | 6/2007 | Brown ................ C07D 251/26 525/391 |
| 7,553,892 | B2 * | 6/2009 | Negishi ................ C08K 5/3492 523/122 |
| 2003/0078347 | A1 | 4/2003 | Brown et al. |
| 2004/0241111 | A1 | 12/2004 | Lazzari et al. |
| 2005/0075465 | A1 | 4/2005 | Bolle et al. |
| 2012/0287556 | A1 * | 11/2012 | Silvi ........................ C08J 5/18 361/301.5 |

FOREIGN PATENT DOCUMENTS

| | | |
|---|---|---|
| JP | 3-39326 A | 2/1991 |
| JP | 6-107779 A | 4/1994 |
| JP | 2779981 B2 | 7/1998 |
| JP | 2005-507957 A | 3/2005 |
| JP | 2005-510611 A | 4/2005 |

OTHER PUBLICATIONS

International Search Report, issued in PCT/JP2014/075936, dated Oct. 28, 2014.
Written Opinion of the International Searching Authority, issued in PCT/JP2014/075936, dated Oct. 28, 2014.

* cited by examiner

ULTRAVIOLET-RAY-ABSORBING POLYCARBONATE

This is a 371 National Stage Application of International Application No. PCT/JP2014/075936, filed on Sep. 29, 2014, which claims priority from JP Application No. 2013-207595, filed on Oct. 2, 2013, which are herein incorporated by reference in their entirety for all purposes.

TECHNICAL FIELD

The present invention relates to a polycarbonate which has ultraviolet-absorbing properties and shows excellent weather resistance.

BACKGROUND ART

As engineering plastics having excellent heat resistance, impact resistance, transparency and the like, polycarbonate resins are used in a wide variety of applications such as optical components, mechanical components, electrical/electronic components, automobile parts, resin glass and building materials. However, polycarbonate resins do not have sufficient weather resistance and there is a problem in that, when exposed to ultraviolet radiation, they are easily deteriorated due to the occurrence of molecular weight reduction, yellowing and the like. This weather resistance is problematic particularly for the outdoor use.

In order to improve the weather resistance of a polycarbonate resin, a method of adding an ultraviolet absorber to a polycarbonate resin has been employed. Examples of the ultraviolet absorber include conventionally known benzophenone-based, benzotriazole-based, triazine-based and cyanoacrylate-based ultraviolet absorbers.

However, in such a conventional method of adding an ultraviolet absorber, the ultraviolet absorber has a problem in terms of heat resistance in that it is thermally decomposed or vaporized due to the heat applied during resin processing (e.g., extrusion, injection molding) and this leads to a reduction in its effect and contamination of the processing facility. Further, in the outdoor use, there is also a problem that long-term weather resistance is not attained due to gradual vaporization of the ultraviolet absorber.

In this respect, as methods of inhibiting such vaporization of an ultraviolet absorber, the Patent Documents 1 to 4 disclose methods of copolymerizing an ultraviolet absorber. However, the weather resistance provided by these methods is still insufficient.

RELATED ART DOCUMENTS

Patent Documents

Patent Document 1: Japanese Unexamined Patent Application Publication No. S49-99596
Patent Document 2: Japanese Unexamined Patent Application Publication No. H1-201330
Patent Document 3: Japanese Unexamined Patent Application Publication No. H3-39326
Patent Document 4: Japanese Unexamined Patent Application Publication No. H6-107779

SUMMARY OF THE INVENTION

Problems to be Solved by the Invention

Therefore, an object of the present invention is to provide an ultraviolet-absorbing polycarbonate which exhibits excellent heat resistance as well as excellent weather resistance without showing a reduction in its performance or contaminating a processing facility during processing.

Means for Solving the Problems

The present inventors intensively studied to solve the above-described problems and discovered that the problems can be solved by a polycarbonate having a specific structure, thereby completing the present invention.

That is, the ultraviolet-absorbing polycarbonate of the present invention is represented by the following Formula (1):

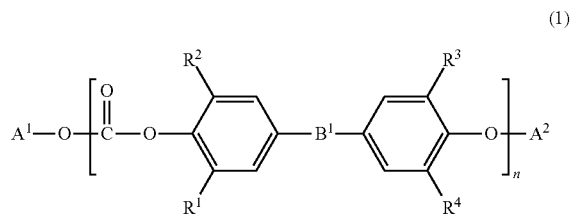

[wherein, n represents an integer of 2 to 300;

$B^1$ represents a linear or branched alkylidene group having 2 to 10 carbon atoms, an alkylene group having 1 to 10 carbon atoms, an arylene group having 6 to 12 carbon atoms, an aryl-substituted alkylene group having 7 to 20 carbon atoms, an aryl-substituted alkylidene group having 8 to 20 carbon atoms, a cycloalkylidene group having 3 to 15 carbon atoms, a cycloalkylene group having 3 to 15 carbon atoms, an alkylidene-arylene-alkylidene group having 10 to 20 carbon atoms, an oxygen atoms, a sulfur atom, a carbonyl group, a sulfonyl group or a direct bond;

$R^1$ to $R^4$ each independently represent a hydrogen atom, a halogen atom, a linear or branched alkyl group having 1 to 12 carbon atoms, a cycloalkyl group having 3 to 8 carbon atoms, an aryl group having 6 to 18 carbon atoms, an alkylaryl group having 7 to 18 carbon atoms or an arylalkyl group having 7 to 18 carbon atoms; and $A^1$ and $A^2$ each independently represent a group represented by the following Formula (2), a hydrogen atom or a group represented by the following Formula (3), with the proviso that at least either of the $A^1$ and $A^2$ is the group represented by the Formula (2):

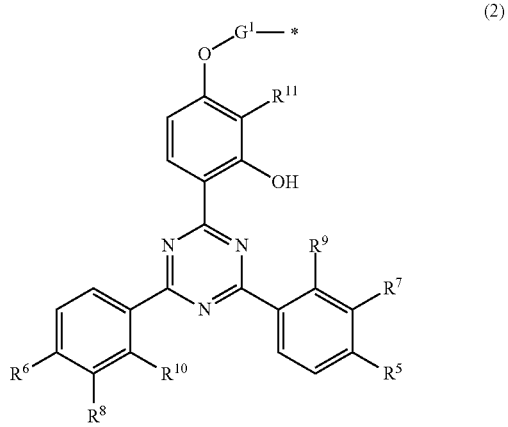

(wherein, $G^1$ represents a linear or branched alkylene group having 1 to 18 carbon atoms which is substituted with a halogen atom, a linear or branched alkyl group having 1 to 18 carbon atoms or a linear or branched alkoxy group having 1 to 18 carbon atoms, or an unsubstituted linear or branched alkylene group having 1 to 18 carbon atoms, the alkylene groups being optionally interrupted by an oxygen atom, a sulfur atom, a carbonyl group, an ester group, an amide group or an imino group and the substitution and interruption optionally existing in combination;

$R^5$ to $R^8$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; or a hydrogen atom, the alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and the substitution and interruption optionally existing in combination;

$R^9$ and $R^{10}$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; a hydrogen atom; or a hydroxy group, the alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and the substitution and interruption optionally existing in combination;

two of the groups represented by the $R^5$, $R^7$ and $R^9$ that are adjacent to each other are optionally linked together to form a 5- to 7-membered ring along with carbon atoms to which these groups are each bound, and two of the groups represented by the $R^6$, $R^8$ and $R^{10}$ that are adjacent to each other are optionally linked together to form a 5- to 7-membered ring along with carbon atoms to which these groups are each bound;

$R^{11}$ represents a hydrogen atom or a linear or branched alkyl group having 1 to 12 carbon atoms; and the Formula (2) is bound to the Formula (1) at the position "*")

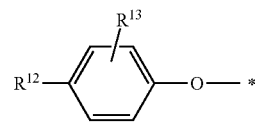

(3)

(wherein, $R^{12}$ represents a hydrogen atom, an alkyl group having 1 to 9 carbon atoms or an arylalkyl group having 7 to 18 carbon atoms; $R^{13}$ represents a hydrogen atom or a methyl group; and the Formula (3) is bound to the Formula (1) at the position "*")].

The ultraviolet-absorbing polycarbonate of the present invention is preferably represented by the following Formula (4):

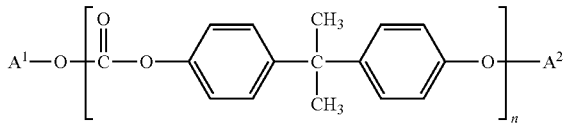

(4)

[wherein, n represents an integer of 2 to 300; and $A^1$ and $A^2$ each independently represent a group represented by the following Formula (5), a hydrogen atom or the group represented by the Formula (3), with the proviso that at least either of the $A^1$ and $A^2$ is the group represented by the Formula (5):

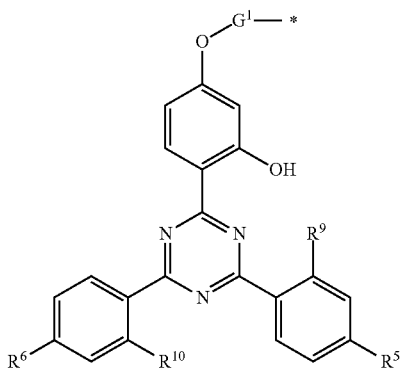

(5)

(wherein, $G^1$ represents a linear or branched alkylene group having 1 to 18 carbon atoms which is substituted with a halogen atom, a linear or branched alkyl group having 1 to 18 carbon atoms or a linear or branched alkoxy group having 1 to 18 carbon atoms, or an unsubstituted linear or branched alkylene group having 1 to 18 carbon atoms, the alkylene groups being optionally interrupted by an oxygen atom, a sulfur atom, a carbonyl group, an ester group, an amide group or an imino group and the substitution and interruption optionally existing in combination;

$R^5$, $R^6$, $R^9$ and $R^{10}$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; or a hydrogen atom, the alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and the substitution and interruption optionally existing in combination; and the Formula (5) is bound to the Formula (4) at the position "*")].

The ultraviolet-absorbing polycarbonate resin composition of the present invention is obtained by adding an additive(s) for synthetic resins to the above-described ultraviolet-absorbing polycarbonate.

The weather-resistant thermoplastic resin composition of the present invention is obtained by adding the above-described ultraviolet-absorbing polycarbonate to a thermoplastic resin.

The method of producing the ultraviolet-absorbing polycarbonate of the present invention is comprising adding a triazine compound represented by the following Formula (7) at the time of performing a polymerization reaction between an aromatic dihydroxy compound represented by the following Formula (6) and a carbonate precursor:

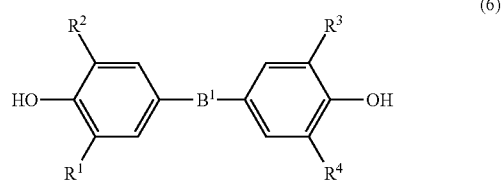

(6)

(wherein, $B^1$ is the same as the $B^1$ of the above-described Formula (1); and $R^1$ to $R^4$ are the same as the $R^1$ to $R^4$ of the above-described Formula (1))

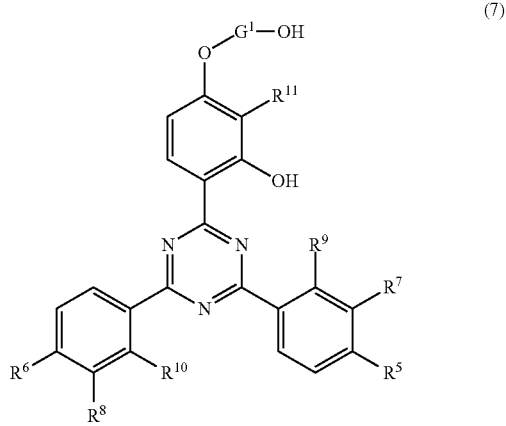

(7)

(wherein, $G^1$ is the same as the $G^1$ of the above-described Formula (2); $R^5$ to $R^8$ are the same as the $R^5$ to $R^8$ of the above-described Formula (2); $R^9$ and $R^{10}$ are the same as the $R^9$ and $R^{10}$ of the above-described Formula (2); and $R^{11}$ is the same as the $R^{11}$ of the above-described Formula (2)).

Effects of the Invention

According to the present invention, an ultraviolet-absorbing polycarbonate which exhibits excellent heat resistance as well as excellent weather resistance without showing a reduction in its performance or contaminating a processing facility during processing can be provided.

MODE FOR CARRYING OUT THE INVENTION

The present invention will now be described in detail.
In the Formula (1), examples of the linear or branched alkylidene group having 2 to 10 carbon atoms that may be represented by the $B^1$ include ethylidene, propylidene, isopropylidene, butylidene, pentylidene, hexylidene, heptylidene, octylidene, nonylidene and decylidene.

Examples of the alkylene group having 1 to 10 carbon atoms include methylene, ethylene, propylene, butylene, pentylene, hexylene, heptylene, octylene, nonylene and decylene.

Examples of the arylene group having 6 to 12 carbon atoms include phenylene, tolylene, xylylene, naphthylene and biphenylene.

Examples of the aryl-substituted alkylene group having 7 to 20 carbon atoms include phenylmethylene and diphenylethylene.

Examples of the aryl-substituted alkylidene group having 8 to 20 carbon atoms include 1-phenyl-1-ethylidene and 1-phenyl-2-propylidene.

Examples of the cycloalkylidene group having 3 to 15 carbon atoms include cyclopentylidene and cyclohexylidene.

Examples of the cycloalkylene group having 3 to 15 carbon atoms include 1,3-cyclopentylene and 1,4-cyclohexylene.

Examples of the alkylidene-arylene-alkylidene group having 10 to 20 carbon atoms include m-diisopropylidene phenylene and p-diisopropylidene phenylene.

From the standpoints of the heat resistance, weather resistance and impact resistance of the polycarbonate, it is preferred that the $B^1$ be an isopropylidene group.

In the Formula (1), examples of the linear or branched alkyl group having 1 to 12 carbon atoms that may be represented by the $R^1$ to $R^4$ include linear or branched alkyl groups such as methyl, ethyl, propyl, isopropyl, butyl, isobutyl, sec-butyl, tert-butyl, amyl, tert-amyl, hexyl, octyl, sec-octyl, tert-octyl, 2-ethylhexyl, decyl, undecyl and dodecyl.

Examples of the cycloalkyl group having 3 to 8 carbon atoms include cyclopropyl, cyclopentyl, cyclohexyl, cycloheptyl and cyclooctyl groups.

Examples of the aryl group having 6 to 18 carbon atoms include phenyl, naphthyl and biphenyl.

Examples of the alkylaryl group having 7 to 18 carbon atoms include methylphenyl, dimethylphenyl, ethylphenyl and octylphenyl groups.

Examples of the arylalkyl group having 7 to 18 carbon atoms include benzyl, 2-phenylethyl, 1-methyl-1-phenylethyl and 2-phenylpropan-2-yl groups.

From the standpoint of the physical properties such as heat resistance, weather resistance and impact resistance, it is preferred that the $R^1$ to $R^4$ be hydrogen atoms.

In the Formula (1), from the standpoints of the heat resistance and weather resistance, it is preferred that the $A^1$ and $A^2$ be both a group represented by the Formula (2).

In the Formula (2), examples of the linear or branched alkylene group having 1 to 18 carbon atoms that may be represented by the $G^1$ include methylene, ethylene, propylene, butylene, pentylene, hexylene, heptylene, octylene, nonylene, decylene, undecylene, dodecylene, tridecylene, tetradecylene, pentadecylene, hexadecylene, heptadecylene and octadecylene. Examples of the linear or branched alkyl group having 1 to 18 carbon atoms with which this alkylene group may be substituted include methyl, ethyl, propyl, isopropyl, butyl, isobutyl, sec-butyl, tert-butyl, amyl, tert-amyl, hexyl, octyl, sec-octyl, tert-octyl, 2-ethylhexyl, decyl, undecyl, dodecyl, tridecyl, tetradecyl, pentadecyl, hexadecyl, heptadecyl and octadecyl groups. Examples of the linear or branched alkoxy group having 1 to 18 carbon atoms include alkoxy groups that correspond to the above-described alkyl groups. The $G^1$ is preferably an unsubstituted linear or branched alkylene group having 1 to 10 carbon atoms, or a branched alkylene group having 1 to 10 carbon atoms that is substituted with a linear or branched alkoxy group having 1 to 10 carbon atoms.

In the Formula (2), examples of the linear or branched alkyl group having 1 to 12 carbon atoms that is represented by the $R^5$ to $R^{10}$ include the same alkyl groups as those exemplified above. Examples of the linear or branched alkoxy group having 1 to 12 carbon atoms include the same alkoxy groups as those exemplified above. Examples of the cycloalkyl group having 3 to 8 carbon atoms include the same cycloalkyl groups as those exemplified above. Examples of the alkenyl group having 2 to 8 carbon atoms include alkenyl groups that correspond to the above-described alkyl groups. Examples of the aryl group having 6 to 18 carbon atoms include the same aryl groups as those exemplified above. Examples of the alkylaryl group having 7 to 18 carbon atoms include the same alkylaryl groups as those exemplified above. Examples of the arylalkyl group having 7 to 18 carbon atoms include the same arylalkyl groups as those exemplified above. Examples of the alkyl group having 1 to 12 carbon atoms with which these groups may be substituted include the same alkyl groups as those exemplified above. Examples of the alkoxy group having 1 to 12 carbon atoms include alkoxy groups that correspond to the above-described alkyl groups.

In the Formula (2), from the standpoints of the heat resistance and weather resistance, the $R^5$ and $R^6$ are each preferably a hydrogen atom, an alkyl group or an aryl group, particularly preferably a hydrogen atom, a methyl group or a phenyl group. From the standpoints of the heat resistance and weather resistance, the $R^7$ and $R^8$ are each preferably a hydrogen atom or an alkyl group, more preferably a hydrogen atom or a methyl group. From the standpoints of the heat resistance and weather resistance, the $R^9$ and $R^{10}$ are each preferably a hydrogen atom, an alkyl group or a hydroxy group, more preferably a hydrogen atom, a methyl group or a hydroxy group, most preferably a hydrogen atom or a methyl group.

In the Formula (2), examples of the linear or branched alkyl group having 1 to 12 carbon atoms that is represented by the $R^{11}$ include the same alkyl groups as those exemplified above. From the standpoints of the heat resistance and weather resistance, the $R^{11}$ is preferably a hydrogen atom or a methyl group, more preferably a hydrogen atom.

In the Formula (3), examples of the alkyl group having 1 to 9 carbon atoms that is represented by the $R^{12}$ include, among the above-described alkyl groups, those having 1 to 9 carbon atoms, and examples of the arylalkyl group having 7 to 18 carbon atoms include benzyl, 2-phenylethyl, 1-methyl-1-phenylethyl and 2-phenylpropan-2-yl groups. From the standpoint of the heat resistance, the $R^{12}$ is preferably a tert-butyl group or a 2-phenylpropan-2-yl group.

Among ultraviolet-absorbing polycarbonates represented by the Formula (1), from the standpoints of the heat resistance, weather resistance and impact resistance, those represented by the following Formula (4) are preferred:

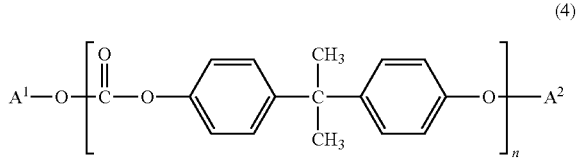

[wherein, n represents an integer of 2 to 300; and $A^1$ and $A^2$ may be the same as or different from each other, representing a group represented by the following Formula (5), a hydrogen atom or a group represented by the Formula (3), with the proviso that at least either of the $A^1$ and $A^2$ is the group represented by the Formula (5):

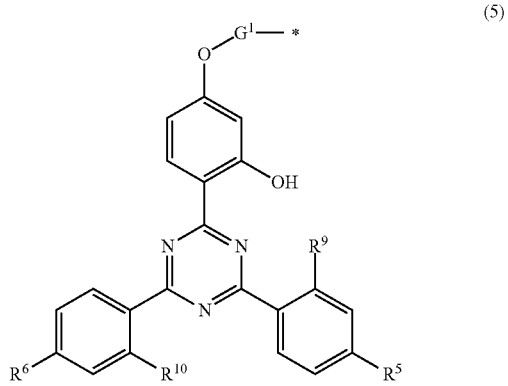

(5)

(wherein, $G^1$, $R^5$ and $R^6$, $R^9$ and $R^{10}$ are the same as those described above; and the Formula (5) is bound to the Formula (4) at the position "*")].

Further, in the Formula (4), from the standpoint of the weather resistance, it is preferred that the $A^1$ and $A^2$ be both a group represented by the Formula (5).

From the standpoints of the heat resistance and weather resistance, the $R^5$ and $R^6$ are each preferably a hydrogen atom, an alkyl group or an aryl group, particularly preferably a hydrogen atom, a methyl group or a phenyl group.

From the standpoints of the heat resistance and weather resistance, the $R^9$ and $R^{10}$ are each preferably a hydrogen atom or an alkyl group, more preferably a hydrogen atom or a methyl group.

Examples of the ultraviolet-absorbing polycarbonate of the present invention that is represented by the Formula (1) include the following Compound No. 1 to No. 8:

Compound No. 1

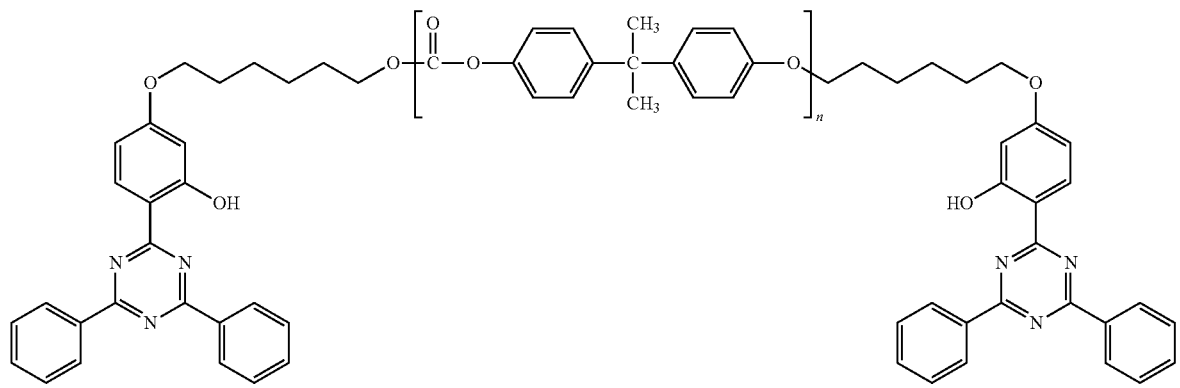

(wherein, n represents an integer of 2 to 300);

Compound No. 2

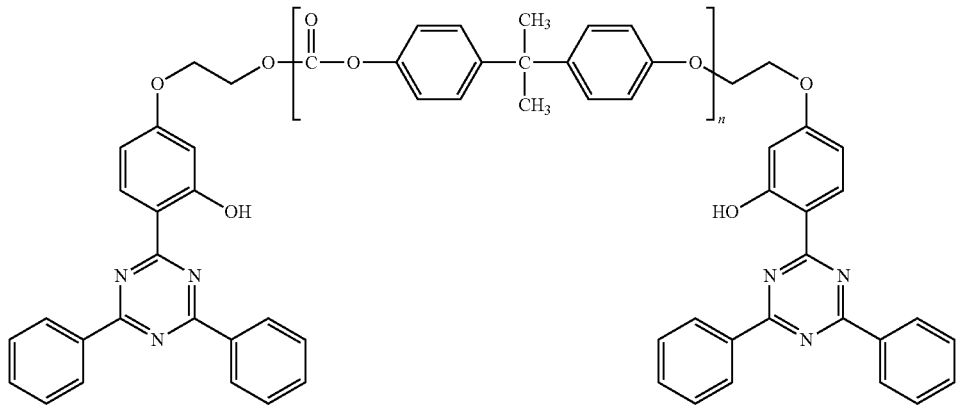

(wherein, n represents an integer of 2 to 300);

Compound No. 3
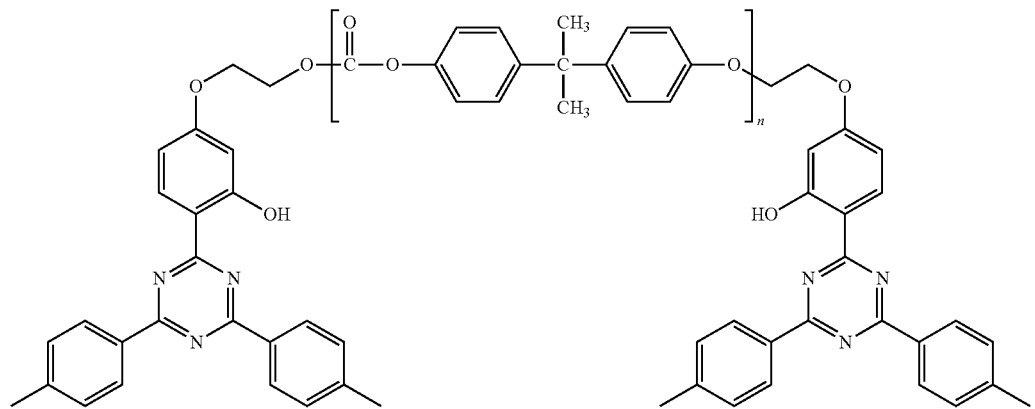
(wherein, n represents an integer of 2 to 300);
Compound No. 4
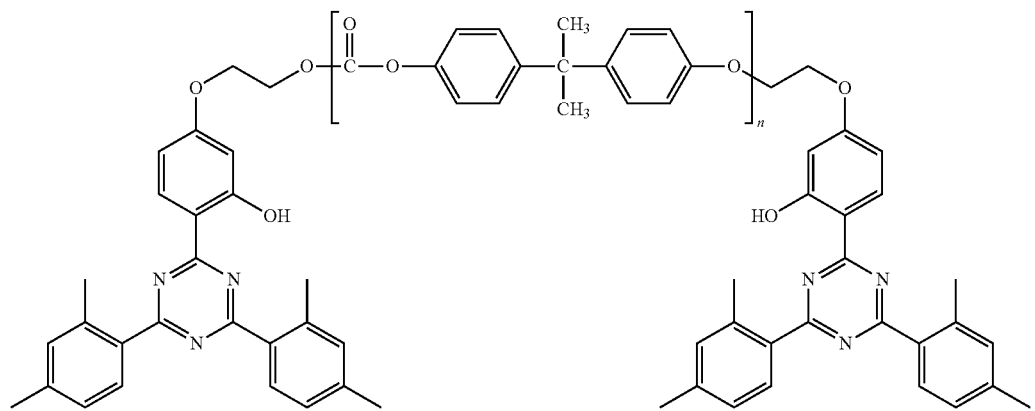
(wherein, n represents an integer of 2 to 300);
Compound No. 5
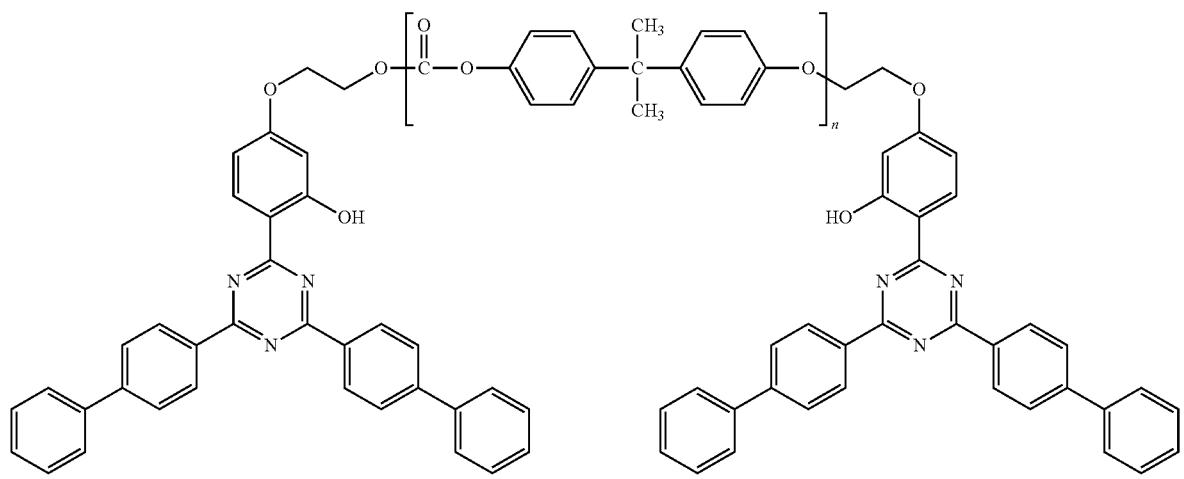
(wherein, n represents an integer of 2 to 300);

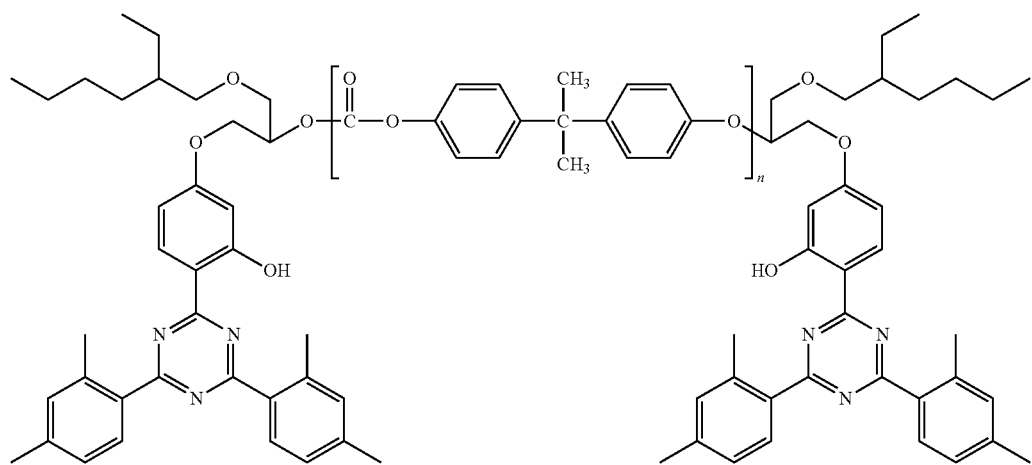
Compound No. 6
(wherein, n represents an integer of 2 to 300);
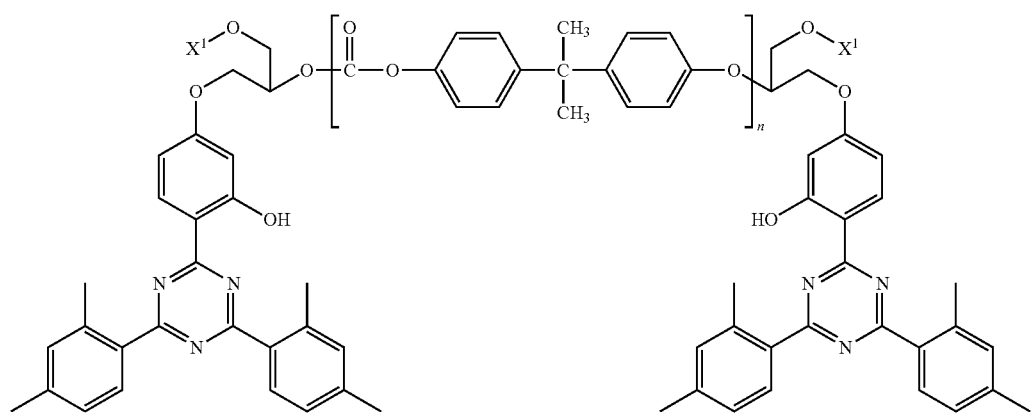
Compound No. 7
(wherein, n represents an integer of 2 to 300; and $X^1$s represent a $C_{12}H_{25}$ group and/or a $C_{13}H_{27}$ group); and
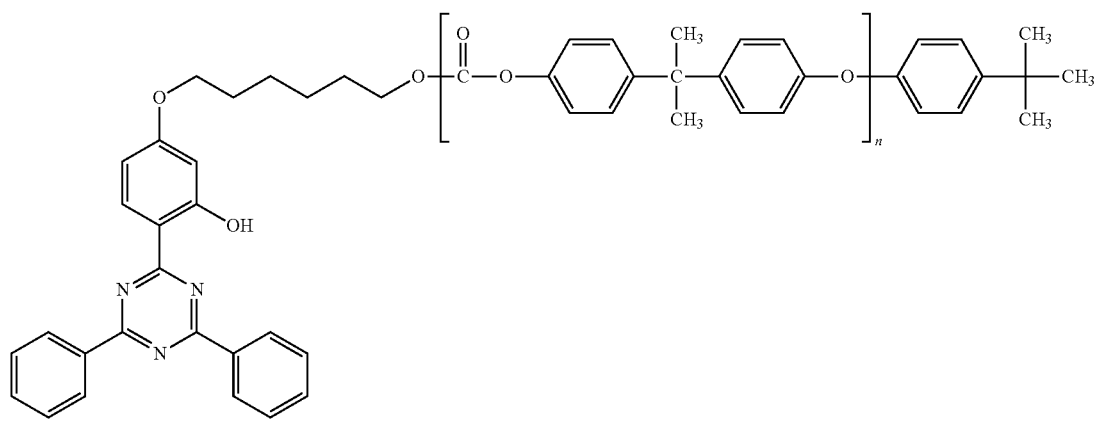
Compound No. 8
(wherein, n represents an integer of 2 to 300).

The method of producing the ultraviolet-absorbing polycarbonate of the present invention will now be described.

The ultraviolet-absorbing polycarbonate of the present invention can be produced by adding a triazine compound represented by the following Formula (7) at the time of performing a polymerization reaction between an aromatic dihydroxy compound represented by the following Formula (6) and a carbonate precursor:

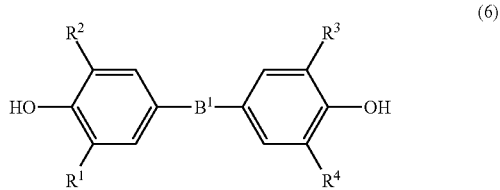

(wherein, $B^1$ and $R^1$ to $R^4$ are the same as those of the Formula (1))

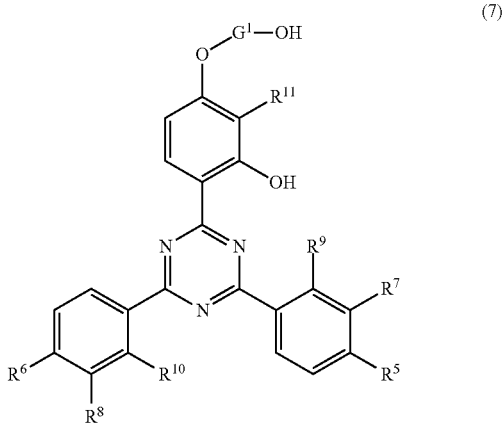

(wherein, $G^1$, $R^5$ to $R^8$, $R^9$, $R^{10}$ and $R^{11}$ are the same as those of the Formula (2)).

Examples of the aromatic dihydroxy compound represented by the Formula (6) that is used in the production method of the present invention include bis(hydroxyaryl)alkanes such as 2,2-bis(4-hydroxyphenyl)propane (=bisphenol A), 2,2-bis(3,5-dibromo-4-hydroxyphenyl)propane (=tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane and 2,2-bis(4-hydroxyphenyl)-1,1,1,3,3,3-hexafluoropropane;

bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane;

cardo structure-containing bisphenols such as 9,9-bis(4-hydroxyphenyl)fluorene and 9,9-bis(4-hydroxy-3-methylphenyl)fluorene;

dihydroxydiaryl ethers such as 4,4'-dihydroxydiphenyl ether and 4,4'-dihydroxy-3,3'-dimethyldiphenyl ether;

dihydroxydiaryl sulfides such as 4,4'-dihydroxydiphenyl sulfide and 4,4'-dihydroxy-3,3'-dimethyldiphenyl sulfide;

dihydroxydiaryl sulfoxides such as 4,4'-dihydroxydiphenyl sulfoxide and 4,4'-dihydroxy-3,3'-dimethyldiphenyl sulfoxide;

dihydroxydiaryl sulfones such as 4,4'-dihydroxydiphenyl sulfone and 4,4'-dihydroxy-3,3'-dimethyldiphenyl sulfone;

hydroquinone; resorcin; and 4,4'-dihydroxydiphenyl.

Thereamong, bis(4-hydroxyphenyl)alkanes are preferred and, from the standpoint of the impact resistance, 2,2-bis(4-hydroxyphenyl)propane (=bisphenol A) is particularly preferred. These aromatic dihydroxy compounds may be used individually, or two or more thereof may be used in combination at an arbitrary ratio.

In the production method of the present invention, as the carbonate precursor to be subjected to the polymerization reaction with the aromatic dihydroxy compound, for example, a carbonyl halide, a carbonate ester or a haloformate is used. Specific examples thereof include phosgene; phosgene derivatives such as triphosgene (bis-trichloromethyl carbonate); diaryl carbonates such as diphenyl carbonate and ditolyl carbonate; dialkyl carbonates such as dimethyl carbonate and diethyl carbonate; and dihaloformates of divalent phenols. These carbonate precursors may also be used individually, or two or more thereof may be used in combination at an arbitrary ratio.

The compound of the Formula (7) used in the production method of the present invention is the desired compound of the Formula (1) in which the part "*" of the group represented by the Formula (2) is an OH group. By using this compound of the Formula (7) in place of or in combination with a terminal capping agent (molecular weight regulator) that is used in a conventionally known polycarbonate polymerization method, the group represented by the Formula (2) is bound to a terminal of the resulting polycarbonate, so that a desired product can be obtained. As the terminal capping agent, as described below, such a monovalent phenolic hydroxyl group-containing compound that yields the structure represented by the Formula (3) is used.

In the production method of the present invention, the method of allowing the aromatic dihydroxy compound of the Formula (6) to react with the carbonate precursor and the compound of the Formula (7) is not particularly restricted, and a conventionally known arbitrary method can be employed. Specific examples thereof include an interfacial polymerization method, a melt transesterification method, a pyridine method, a ring-opening polymerization method for a cyclic carbonate compound, and a solid-phase transesterification method for a prepolymer.

Thereamong, as a representative production method of an aromatic polycarbonate resin, an interfacial polymerization method will be described first.

In this production method, as a polymerization reaction, in the presence of an organic solvent inert to reaction as well as an aqueous alkaline solution and while maintaining the pH usually at 9 or higher, an aromatic dihydroxy compound is allowed to react with phosgene along with a terminal capping agent and, as required, an antioxidant for inhibition of oxidation of the aromatic dihydroxy compound, and a polymerization catalyst such as a tertiary amine or a quaternary ammonium salt is subsequently added to the resultant to perform interfacial polymerization to obtain a polycarbonate.

In the present invention, as the terminal capping agent, a compound of the Formula (7) may be used.

The timing of the addition of the compound of the Formula (7) is not particularly restricted as long as the addition is performed at a time between the phosgenation and the start of the polymerization reaction. The reaction temperature is, for example, 0 to 40° C., and the reaction time is, for example, several minutes (e.g., 10 minutes) to several hours (e.g., 6 hours).

Specific examples of the organic solvent inert to reaction include chlorinated hydrocarbons such as dichloromethane, 1,2-dichloroethane, chloroform, monochlorobenzene and dichlorobenzene; and aromatic hydrocarbons such as benzene, toluene and xylene. Further, examples of an alkali compound used in the aqueous alkaline solution include alkali metal hydroxides such as sodium hydroxide and potassium hydroxide.

Examples of the terminal capping agent used in combination with the compound of the Formula (7) include compounds having a monovalent phenolic hydroxyl group, and specific examples thereof include m-methylphenol, p-methylphenol, m-propylphenol, p-propylphenol, p-tert-butylphenol and p-long-chain alkyl-substituted phenols.

Examples of the polymerization catalyst include tertiary amines such as trimethylamine, triethylamine, tributylamine, tripropylamine, trihexylamine and pyridine; and quaternary ammonium salts such as trimethylbenzylammonium chloride, tetramethylammonium chloride and triethylbenzylammonium chloride.

Further, in place of phosgene, triphosgene (bis-trichloromethyl carbonate) or the like may be used to perform the reaction in a solution in the same manner.

Next, a melt transesterification method will be described. The polymerization reaction in this production method is a transesterification reaction between, for example, a carbonic acid diester and an aromatic dihydroxy compound. Specific examples of the carbonic acid diester include dialkyl carbonate compounds such as dimethyl carbonate, diethyl carbonate and di-tert-butyl carbonate; diphenyl carbonate; and substituted diphenyl carbonates such as ditolyl carbonate. Thereamong, the carbonic acid diester is preferably diphenyl carbonate, a substituted diphenyl carbonate or the like, particularly preferably diphenyl carbonate.

In the melt transesterification method as well, the compound of the Formula (7) is used as a terminal capping agent. The compound of the Formula (7) may also be used in combination with the above-described terminal capping agent having a monovalent phenolic hydroxyl group. In cases where a polycarbonate is produced by such a melt transesterification method, a transesterification catalyst is usually used. As the transesterification catalyst, a conventionally known transesterification catalyst can be arbitrarily used and, specifically, for example, an alkali metal compound and/or an alkaline earth metal compound is/are preferably used. Further, supplementarily, a basic compound such as a basic boron compound, a basic phosphorus compound, a basic ammonium compound or an amine-based compound may also be used in combination.

The transesterification reaction using the above-described materials is usually performed at a temperature of 100 to 320° C. and a melt polycondensation reaction may be eventually performed under a reduced pressure of 2 mmHg or less while removing by-products such as an aromatic hydroxy compound.

The melt polycondensation can be performed by either a batch method or a continuous method. Particularly, taking into consideration the stability and the like of the aromatic polycarbonate resin used in the present invention and the resin composition of the present invention, the melt polycondensation is preferably performed by a continuous method. As a catalyst deactivator used in the melt transesterification method, it is preferred to use a compound that neutralizes the transesterification catalyst, such as a sulfur-containing acidic compound, or a derivative formed therefrom.

In the production method of the present invention, the molecular weight of the resulting polycarbonate can be controlled by adjusting the amount of the compound of the Formula (7).

It is also preferred to incorporate an additive for synthetic resins into the ultraviolet-absorbing polycarbonate of the present invention to use the resultant as an ultraviolet-absorbing polycarbonate resin composition.

It is noted here that since the ultraviolet-absorbing polycarbonate of the present invention has ultraviolet-absorbing properties, it is not required to incorporate an ultraviolet absorber in particular; however, the ultraviolet-absorbing polycarbonate of the present invention may also be used in combination with other ultraviolet absorber.

Examples of the additive for synthetic resins include phenolic antioxidants, phosphorus-based antioxidants, thioether-based antioxidants, ultraviolet absorbers, hindered amine-based light stabilizers, triazine ring-containing compounds, metal hydroxides, phosphate-based flame retardants, condensed phosphate-based flame retardants, phosphate-based flame retardants, inorganic phosphorus-based flame retardants, (poly)phosphate-based flame retardants, halogen-based flame retardants, silicon-based flame retardants, antimony oxides, inorganic flame retardant aids, organic flame retardant aids, antistatic agents, lubricants, nucleating agents, plasticizers, mold release agents, compatibilizers, foaming agents, light-absorbing dyes, pigments, dyes, processing aids, metal deactivators, inorganic fine particles, antibacterial agents, antifungal agents, bulking agents and fillers.

Examples of the phenolic antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thiobis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl] methane, thiodiethylene glycol-bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{-tert-butyl-4-hydroxy-5-methylphenyl)propionyloxy}ethyl]-2,4,8,10-tetraoxaspiro[5,5]undecane, and triethylene glycol-bis[(3-tert-butyl-4-hydroxy-5-methylphenyl)propionate]. These phenolic antioxidants are added in an amount of preferably 0.001 to 10 parts by mass, more preferably 0.05 to 5 parts by mass, with respect to 100 parts by mass of the ultraviolet-absorbing polycarbonate.

Examples of the phosphorus-based antioxidants include trisnonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl) biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl) oxy]ethyl)amine, and phosphite of 2-ethyl-2-butylpropylene glycol and 2,4,6-tri-tert-butylphenol. These phosphorus-based antioxidants are added in an amount of preferably 0.001 to 10 parts by mass, more preferably 0.05 to 5 parts by mass, with respect to 100 parts by mass of the ultraviolet-absorbing polycarbonate.

Examples of the thioether-based antioxidants include dialkyl thiodipropionates such as dilauryl thiodipropionate, dimyristyl thiodipropionate and distearyl thiodipropionate; and pentaerythritol-tetra(β-alkylthiopropionic acid)esters. These thioether-based antioxidants are added in an amount of preferably 0.001 to 10 parts by mass, more preferably 0.05 to 5 parts by mass, with respect to 100 parts by mass of the ultraviolet-absorbing polycarbonate.

Examples of the ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyl)phenol) and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and triaryl triazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine and 2-(2-hydroxy-4-propoxy-5-methylphenyl)-4,6-bis(2,4-di-tert-butylphenyl)-s-triazine. These ultraviolet absorbers are added in an amount of preferably 0.001 to 30 parts by mass, more preferably 0.05 to 10 parts by mass, with respect to 100 parts by mass of the ultraviolet-absorbing polycarbonate.

Examples of the hindered amine-based light stabilizers include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl)sebacate, bis(1,2,2,6,6-tetramethyl-4-piperidyl)sebacate, bis(1-oxtoxy-2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di (tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis [2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-yl]aminoundecane and 1,6,11-tris[2,4-bis(N-butyl-N-(1,2,2,6,6-pentamethyl-4-piperidyl)amino)-s-triazine-6-yl]aminoundecane. These hindered amine-based light stabilizers are added in an amount of preferably 0.001 to 30 parts by mass, more preferably 0.05 to 10 parts by mass, with respect to 100 parts by mass of the ultraviolet-absorbing polycarbonate.

Examples of the triazine ring-containing compounds include melamine, ammeline, benzoguanamine, acetoguanamine, phthalodiguanamine, melamine cyanurate, melamine pyrophosphate, butylene diguanamine, norbornene diguanamine, methylene diguanamine, ethylene dimelamine, trimethylene dimelamine, tetramethylene dimelamine, hexamethylene dimelamine and 1,3-hexylene dimelamine.

Examples of the metal hydroxides include magnesium hydroxide, aluminum hydroxide, calcium hydroxide, barium hydroxide, zinc hydroxide and KISUMA 5A (magnesium hydroxide, manufactured by Kyowa Chemical Industry Co., Ltd.).

Examples of the phosphate-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, tris (isopropylphenyl) phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate and tris(isopropylphenyl)phosphate.

Examples of the condensed phosphate-based flame retardants include 1,3-phenylene-bis(diphenylphosphate), 1,3-phenylene-bis(dixylenylphosphate) and bisphenol A-bis(diphenylphosphate).

Examples of the (poly)phosphate-based flame retardants include ammonium salts and amine salts of (poly)phosphoric acid, such as ammonium polyphosphate, melamine polyphosphate, piperazine polyphosphate, melamine pyrophosphate and piperazine pyrophosphate.

Examples of the inorganic flame retardant aids include inorganic compounds such as titanium oxide, aluminum oxide, magnesium oxide, hydrotalcites, talc and montmorillonite, and surface-treated products thereof. For example, a variety of commercially available products, such as TIPAQUE R-680 (titanium oxide: manufactured by Ishihara Sangyo Kaisha, Ltd.), KYOWAMAG 150 (magnesium oxide: manufactured by Kyowa Chemical Industry Co., Ltd.), DHT-4A (hydrotalcite: manufactured by Kyowa Chemical Industry Co., Ltd.) and ALCAMIZER 4 (zinc-modified hydrotalcite: manufactured by Kyowa Chemical Industry Co., Ltd.), can be used. Examples of the organic flame retardant aids include pentaerythritol.

Examples of the antistatic agents include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators.

Examples of the lubricants include hydrocarbon-based lubricants such as liquid paraffins, paraffin waxes and polyethylene waxes; fatty acid-based lubricants such as stearyl alcohol, stearic acid and 12-hydroxystearic acid; amide-based lubricants such as stearic acid amide, oleic acid amide, erucic acid amide, methylene-bis-stearic acid amide and ethylene stearic acid amide; metallic soap-based lubricants such as calcium stearate, zinc stearate, magnesium stearate, lead stearate, aluminum stearate, barium stearate, barium stearate-zinc stearate complex and zinc stearate-calcium stearate complex; and ester-based lubricants such as hydrogenated oil, glycerin monostearate, butyl stearate, pentaerythritol stearate and stearyl stearate.

Examples of the nucleating agents include dibenzylidene sorbitol, bis(p-methylbenzylidene)sorbitol, bis(p-ethylbenzylidene)sorbitol, aluminum hydroxy-di(t-butylbenzoate), sodium bis(4-t-butylphenyl)phosphate and sodium 2,2'-methylene-bis(4,6-di-t-butylphenyl)phosphate.

Examples of the plasticizers include phthalates, dibasic acid esters, chlorinated paraffins, polyesters, epoxidized esters, phosphates and trimellitates.

Examples of the bulking agents include calcium silicate powder, silica powder, talc powder, mica powder, alumina powder, titanium oxide powder and glass flake. Examples of the fillers include glass fibers and carbon fibers.

The method of producing the ultraviolet-absorbing polycarbonate resin composition of the present invention is not particularly restricted, and a conventionally known arbitrary method for producing a resin composition can be employed.

Specific examples thereof include a method in which an ultraviolet absorbing polycarbonate and an additive component(s) are pre-mixed using a mixer such as a tumbler or a Henschel mixer and the resulting mixture is subsequently melt-kneaded using a Banbury mixer, a roll, a Brabender, an uniaxial kneading extruder, a biaxial kneading extruder, a kneader or the like.

Alternatively, the components may be fed to an extruder using a feeder without pre-mixing or after pre-mixing of only a part of the components and subsequently melt-kneaded to produce a resin composition. Further, it is also possible to produce a resin composition by pre-mixing a part of the components, feeding the components to an extruder, melt-kneading the components, preparing a masterbatch of the resulting resin composition and again mixing and melt-kneading the masterbatch with other component(s).

A molding article having excellent weather resistance can be obtained by molding the ultraviolet-absorbing polycarbonate or ultraviolet-absorbing polycarbonate resin composition of the present invention. The molding method is not particularly restricted, and examples thereof include extrusion processing, calender processing, injection molding, rolling, compression molding, blow molding and rotational molding. Molded articles of various shapes, such as resin plates, sheets, films, bottles, fibers and special shape articles, can be produced by these methods.

In addition to being used as a resin component, the ultraviolet-absorbing polycarbonate of the present invention may also be used by being added to various thermoplastic resins as an ultraviolet absorber in the same manner as conventionally known ultraviolet absorbers. Needless to say, the ultraviolet-absorbing polycarbonate of the present invention may also be incorporated into a conventionally known polycarbonate. The weather-resistant thermoplastic resin composition of the present invention is obtained by adding the ultraviolet-absorbing polycarbonate of the present invention to a thermoplastic resin. When the ultraviolet-absorbing polycarbonate of the present invention is incorporated into a thermoplastic resin, the amount thereof is preferably 0.01 to 90 parts by mass, more preferably 0.05 to 50 parts by mass, still more preferably 0.1 to 30 parts by mass, with respect to 100 parts by mass of the thermoplastic resin.

Examples of a thermoplastic resin that can be used in the weather-resistant thermoplastic resin composition of the present invention include α-olefin polymers such as polypropylene, high-density polyethylene, low-density polyethylene, linear low-density polyethylene, cross-linked polyethylene, ultrahigh-molecular-weight polyethylene, polybutene-1, poly-3-methylpentene and poly-4-methylpentene; polyolefin-based resins and copolymers thereof, such as ethylene-vinyl acetate copolymers, ethylene-ethyl acrylate copolymers and ethylene-propylene copolymers; halogen-containing resins, such as polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers; petroleum resins; coumarone resins; polystyrene; polyvinyl acetate; acrylic resins; copolymers (e.g., AS resins, ABS resins, ACS resins, SBS resins, MBS resins and heat-resistant ABS resins) composed of styrene and/or α-methylstyrene with other monomer (e.g., maleic anhydride, phenylmaleimide, methyl methacrylate, butadiene or acrylonitrile); polymethyl methacrylates; polyvinyl alcohols; polyvinyl formals; polyvinyl butyrals; aromatic polyesters including polyalkylene terephthalates, such as polyethylene terephthalate, polybutylene terephthalate and polycyclohexane dimethylene terephthalate, and polyalkylene naphthalates such as polyethylene naphthalate and polybutylene naphthalate, and linear polyesters such as polytetramethylene terephthalate; degradable aliphatic polyesters such as polyhydroxy butyrate, polycaprolactone, polybutylene succinate, polyethylene succinate, polylactic acid, polymalic acid, polyglycolic acid, polydioxane and poly(2-oxetanone); and thermoplastic resins and blends thereof, such as polyamides (e.g., polyphenylene oxide, polycaprolactam and polyhexamethylene adipamide), polycarbonates, polycarbonate/ABS resins, branched polycarbonates, polyacetals, polyphenylene sulfides, polyurethanes, cellulose-based resins, polyimide resins, polysulfones, polyphenylene ethers, polyether ketones, polyether ether ketones and liquid crystal polymers. Further, the thermoplastic resin may be an elastomer, such as an isoprene rubber, a butadiene rubber, an acrylonitrile-butadiene copolymer rubber, a styrene-butadiene copolymer rubber, a fluorine rubber, a silicone rubber, an olefin-based elastomer, a styrene-based elastomer, a polyester-based elastomer, a nitrile-based elastomer, a nylon-based elastomer, a vinyl chloride-based elastomer, a polyamide-based elastomer or a polyurethane-based elastomer. These thermoplastic resins may be used individually, or two or more thereof may be used in combination. Moreover, these thermoplastic resins may be alloyed as well.

These thermoplastic resins can be used regardless of their molecular weight, polymerization degree, density, softening point, ratio of solvent-insoluble component(s), degree of stereoregularity, presence or absence of catalyst residue, type and blend ratio of each material monomer, type of polymerization catalyst (e.g., a Ziegler catalyst, a metallocene catalyst or the like).

The ultraviolet-absorbing polycarbonate of the present invention is preferably used particularly in those applications requiring weather resistance and can be used in optical components, mechanical components, electrical/electronic components, automobile parts, resin glass, building materials and the like. More specifically, the ultraviolet-absorbing polycarbonate of the present invention can be used in office work automation equipments, such as printers, personal computers, word processors, keyboards, PDA (Personal Digital Assistant) devices, phones, copy machines, facsimiles, ECRs (electronic cash registers), electronic calculators, electronic organizers, cards, holders and stationeries; household electric appliances, such as laundry machines, refrigerators, vacuum cleaners, microwave ovens, lighting equipments, game machines, irons and kotatsu; audio and visual devices, such as televisions, video tape recorders, video cameras, radio-cassette players, tape recorders, mini discs, CD players, speakers and liquid crystal displays; and electric/electronic components and communication devices, such as connectors, relays, capacitors, switches, printed circuit boards, coil bobbins, semiconductor sealing materials, LED sealing materials, electric wires, cables, transformers, deflection yokes, distribution boards and clocks.

Further, the ultraviolet-absorbing polycarbonate of the present invention can also be used in optical material applications such as optical discs, CDs, DVDs and lenses; and glass substitute applications.

Moreover, the ultraviolet-absorbing polycarbonate of the present invention can also be used in other various applications, including materials of cars, vehicles, ships, airplanes, buildings and houses as well as construction and civil engineering materials, such as seats (e.g., stuffing and cover materials), belts, ceiling covers, convertible tops, armrests, door trims, rear package trays, carpets, mats, sun visors, wheel covers, mattress covers, air-bags, insulating materials, straps, strap belts, wire coating materials, electric insulating materials, paints, coating materials, veneer materials, floor materials, baffle walls, wallpapers, wall decorating materials, exterior materials, interior materials, roof materials, deck materials, wall materials, pillar materials, floor boards, fence materials, framing and moulding materials, window and door-shaping materials, shingle boards, sidings, terraces, balconies, soundproof boards, heat insulating boards and window materials; and household articles and sporting goods, such as clothing materials, curtains, sheets, plywood boards, synthetic fiber boards, rugs, doormats, leisure sheets, buckets, hoses, containers, eye glasses, bags, casings, goggles, ski boards, rackets, tents and musical instruments.

EXAMPLES

The present invention will now be described in detail by way of examples and comparative examples. The present invention, however, is not restricted by the following examples by any means.

[Example 1] Synthesis of Compound No. 1

First, 5.93 g of bisphenol A (reagent manufactured by Tokyo Chemical Industry Co., Ltd.), 0.35 g of the below-described triazine compound A, 160 g of dichloromethane and 6.41 g of triethylamine were added to a 300-ml two-necked round-bottomed flask equipped with a Dimroth condenser and dissolved at room temperature. After cooling the resultant to 5° C., 3.13 g of triphosgene was added thereto in small portions over a period of 1 hour and the resulting mixture was heated to reflux at 40° C. for 1 hour. After the completion of the reaction, the resultant was cooled to room temperature and then washed with 50 ml of ion-exchanged water three times. The resulting reaction mass was added dropwise to 300 g of methanol contained in a 500-ml beaker to allow a polymer to precipitate, which polymer was subsequently recovered by filtration. Then, the thus recovered polymer was washed with 100 ml of methanol three times. Thereafter, the polymer was dried at 90° C. under reduced pressure to obtain the below-described Compound No. 1, which is the ultraviolet-absorbing polycarbonate of the present invention, in an amount of 6.51 g (yield=93.3%).

The number-average molecular weight (Mn) of the thus obtained Compound No. 1 was determined by the below-described molecular weight measurement method. The result thereof is shown in Table 1.

In addition, as a heat resistance test of the Compound No. 1, the 1% weight reduction temperature was measured by the below-described heat resistance test method. The result thereof is shown in Table 1.

Further, a cast film was prepared by the below-described cast film preparation method. For the thus obtained cast film, the haze value and weather resistance were determined by the below-described transparency test method and weather resistance test method, respectively. The results thereof are shown in Table 1.

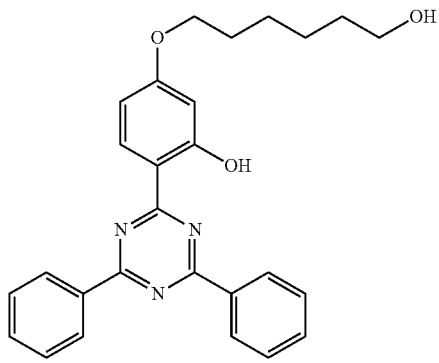

Triazine compound A

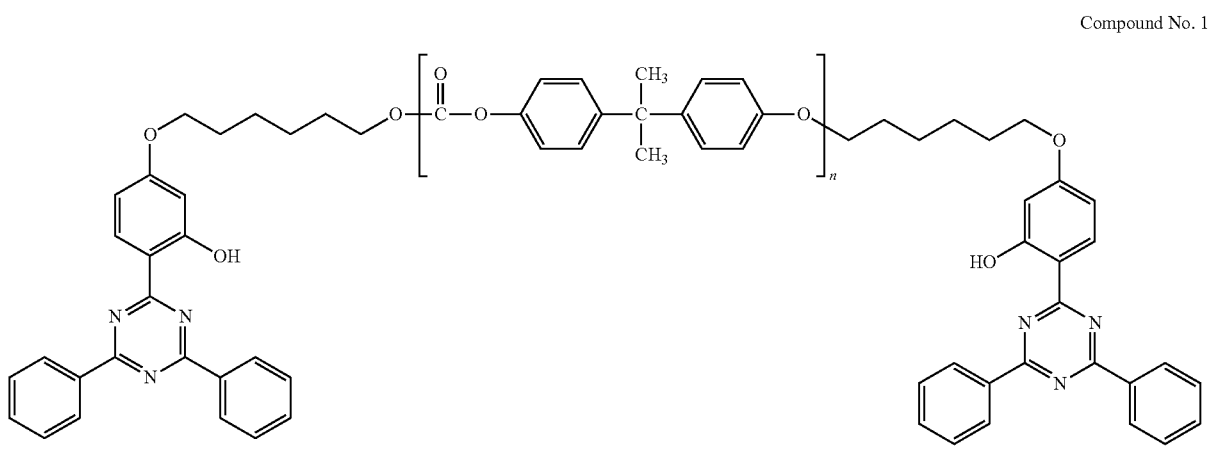

Compound No. 1

[Example 2] Synthesis of Compound No. 2

First, 5.86 g of bisphenol A (reagent manufactured by Tokyo Chemical Industry Co., Ltd.), 0.35 g of the below-described triazine compound B, 160 g of dichloromethane and 6.40 g of triethylamine were added to a 300-ml two-necked round-bottomed flask equipped with a Dimroth condenser and dissolved at room temperature. After cooling the resultant to 5° C., 3.10 g of triphosgene was added thereto in small portions over a period of 1 hour and the resulting mixture was heated to reflux at 40° C. for 1 hour. After the completion of the reaction, the resultant was cooled to room temperature and then washed with 50 ml of ion-exchanged water three times. The resulting reaction mass was added dropwise to 300 g of methanol contained in a 500-ml beaker to allow a polymer to precipitate, which polymer was subsequently recovered by filtration. Then, the thus recovered polymer was washed with 100 ml of methanol three times. Thereafter, the polymer was dried at 90° C. under reduced pressure to obtain the below-described Compound No. 2, which is the ultraviolet-absorbing polycarbonate of the present invention, in an amount of 6.43 g (yield=93.4%).

The number-average molecular weight (Mn) of the thus obtained Compound No. 2 was determined by the below-described molecular weight measurement method. The result thereof is shown in Table 1.

In addition, as a heat resistance test of the Compound No. 2, the 1% weight reduction temperature was measured by the below-described heat resistance test method. The result thereof is shown in Table 1.

Further, a cast film was prepared by the below-described cast film preparation method. For the thus obtained cast film, the haze value and weather resistance were determined by the below-described transparency test method and weather resistance test method, respectively. The results thereof are shown in Table 1.

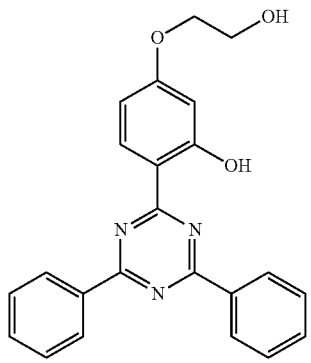

Triazine compound B

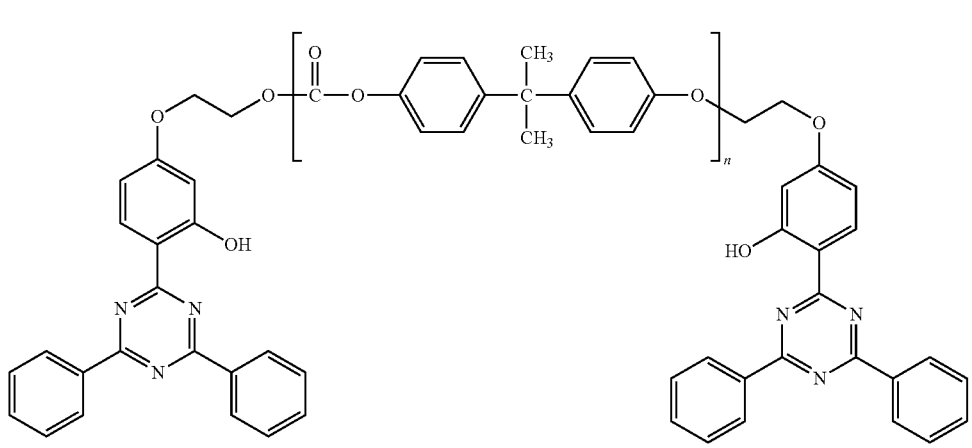

Compound No. 2

[Example 3] Synthesis of Compound No. 4

First, 5.38 g of bisphenol A (reagent manufactured by Tokyo Chemical Industry Co., Ltd.), 0.35 g of the below-described triazine compound C, 160 g of dichloromethane and 5.34 g of triethylamine were added to a 300-ml two-necked round-bottomed flask equipped with a Dimroth condenser and dissolved at room temperature. After cooling the resultant to 5° C., 2.61 g of triphosgene was added thereto in small portions over a period of 1 hour and the resulting mixture was heated to reflux at 40° C. for 1 hour. After the completion of the reaction, the resultant was cooled to room temperature and then washed with 50 ml of ion-exchanged water three times. The resulting reaction mass was added dropwise to 300 g of methanol contained in a 500-ml beaker to allow a polymer to precipitate, which polymer was subsequently recovered by filtration. Then, the thus recovered polymer was washed with 100 ml of methanol three times. Thereafter, the polymer was dried at 90° C. under reduced pressure to obtain the below-described Compound No. 4, which is the ultraviolet-absorbing polycarbonate of the present invention, in an amount of 5.87 g (yield=92.2%).

The number-average molecular weight (Mn) of the thus obtained Compound No. 4 was determined by the below-described molecular weight measurement method. The result thereof is shown in Table 1.

In addition, as a heat resistance test of the Compound No. 4, the 1% weight reduction temperature was measured by the below-described heat resistance test method. The result thereof is shown in Table 1.

Further, a cast film was prepared by the below-described cast film preparation method. For the thus obtained cast film, the haze value and weather resistance were determined by the below-described transparency test method and weather resistance test method, respectively. The results thereof are shown in Table 1.

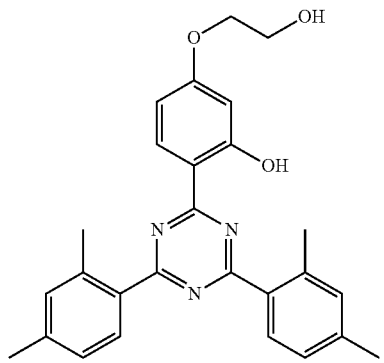

Triazine compound C

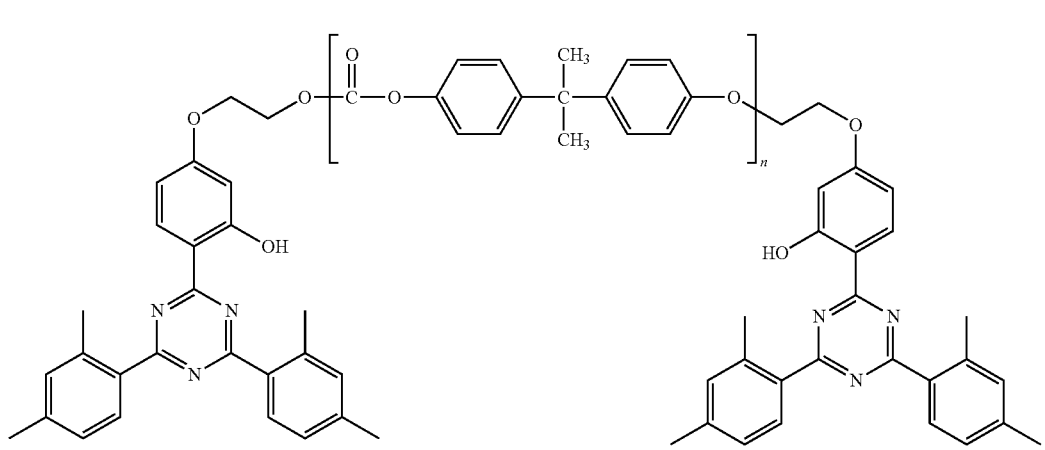

Compound No. 4

[Example 4] Synthesis of Compound No. 5

First, 6.39 g of bisphenol A (reagent manufactured by Tokyo Chemical Industry Co., Ltd.), 0.38 g of the below-described triazine compound D, 160 g of dichloromethane and 6.89 g of triethylamine were added to a 300-ml two-necked round-bottomed flask equipped with a Dimroth condenser and dissolved at room temperature. After cooling the resultant to 5° C., 3.37 g of triphosgene was added thereto in small portions over a period of 1 hour and the resulting mixture was heated to reflux at 40° C. for 1 hour. After the completion of the reaction, the resultant was cooled to room temperature and then washed with 50 ml of ion-exchanged water three times. The resulting reaction mass was added dropwise to 300 g of methanol contained in a 500-ml beaker to allow a polymer to precipitate, which polymer was subsequently recovered by filtration. Then, the thus recovered polymer was washed with 100 ml of methanol three times. Thereafter, the polymer was dried at 90° C. under reduced pressure to obtain the below-described Compound No. 5, which is the ultraviolet-absorbing polycarbonate of the present invention, in an amount of 7.05 g (yield=93.9%).

The number-average molecular weight (Mn) of the thus obtained Compound No. 5 was determined by the below-described molecular weight measurement method. The result thereof is shown in Table 1.

In addition, as a heat resistance test of the Compound No. 5, the 1% weight reduction temperature was measured by the below-described heat resistance test method. The result thereof is shown in Table 1.

Further, a cast film was prepared by the below-described cast film preparation method. For the thus obtained cast film, the haze value and weather resistance were determined by the below-described transparency test method and weather resistance test method, respectively. The results thereof are shown in Table 1.

Triazine compound D

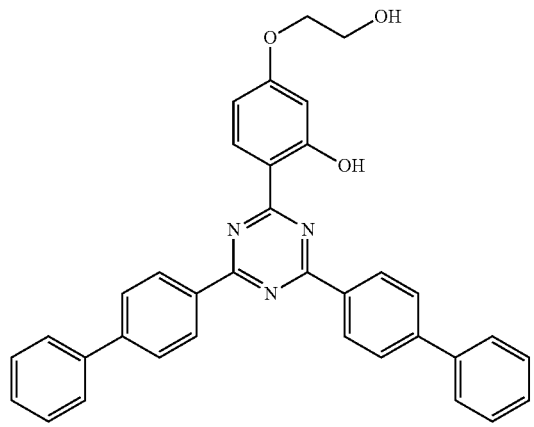

Compound No. 5

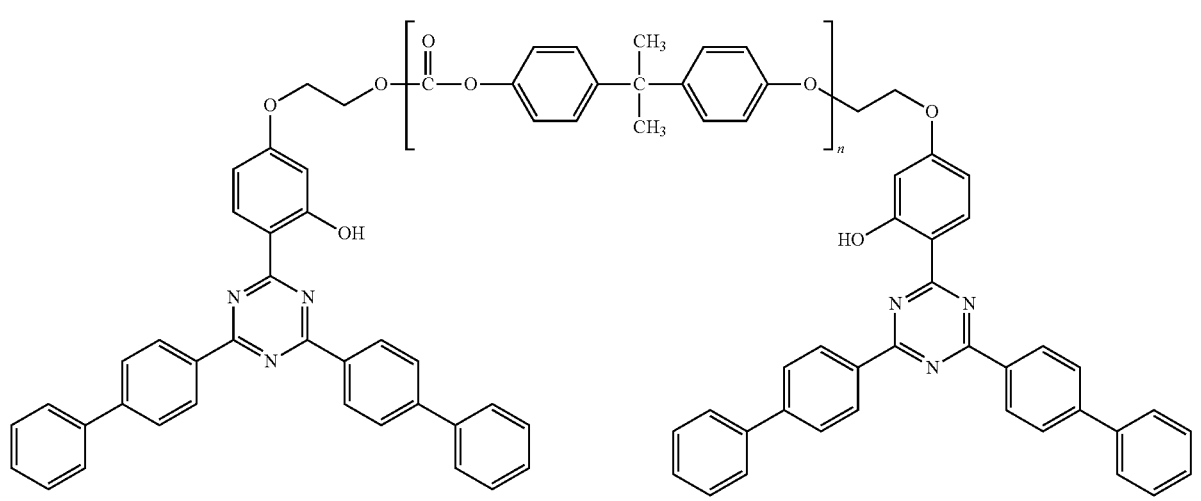

<Molecular Weight Measurement Method>

The number-average molecular weight (hereinafter, referred to as "Mn") was measured by gel permeation chromatography (GPC). The Mn measurement conditions were as follows.

Apparatus: GPC apparatus, manufactured by JASCO Corporation
  Solvent: tetrahydrofuran
  Standard substance: polystyrene
  Detector: differential refractometer (RI detector)
  Column stationary phase: SHODEX KF-804L, manufactured by Showa Denko K.K.
  Column temperature: 40° C.
  Sample concentration: 1 mg/1 mL
  Flow rate: 0.8 mL/min.
  Injection volume: 100 μL <Heat Resistance Test Method>

Using a thermogravimetric-differential thermal analyzer THERMO PLUS EVO (manufactured by Rigaku Corporation), the thus obtained compounds were each heated from 30° C. to 400° C. at a heating rate of 10° C./min under an air flow of 200 ml/min and the 1% weight reduction temperature was measured.

<Cast Film Preparation Method>

The Compound Nos. 1, 2, 4 and 5, which are the ultraviolet-absorbing polycarbonates of the present invention obtained above, were each dried at 120° C. for 6 hours. Subsequently, using LABO-PLASTOMILL MICRO (manufactured by Toyo Seiki Seisaku-sho, Ltd.), 250 mg of each ultraviolet-absorbing polycarbonate and 2.25 g of a commercially available polycarbonate resin (LUPILON S-3000F, manufactured by Mitsubishi Engineering-Plastics Corporation) were melt-kneaded (300° C., 50 rpm, 5 minutes) to obtain a pellet of an ultraviolet-absorbing polycarbonate resin composition.

Then, 1.25 g of each of the thus obtained pellets was placed in a 25-ml volumetric flask and dichloromethane was added up to the reference line. After leaving the flask to stand for about 1 hour at room temperature so as to dissolve the pellet, the resulting solution was transferred to a Petri dish (diameter: 60 mm) using a 4-ml transfer pipette and dried for 30 minutes at room temperature. Thereafter, the resulting film was peeled off from the Petri dish to obtain a 50 μm-thick polycarbonate cast film.

<Transparency Test Method>

The haze value of each of the thus obtained cast films was measured.

The measurement was performed using HAZE GUARD II (trade name, manufactured by Toyo Seiki Seisaku-sho Ltd.) at 5 spots on each film and the average thereof was determined.

<Weather Resistance Test Method>

After subjecting each of the thus obtained cast films to a sunshine weather meter manufactured by Suga Test Instruments Co., Ltd. (83° C., with water spray) for 1,000 hours, the film yellowness (Y.I.) was measured by a transmission method using a multiple light source spectrocolorimeter manufactured by Suga Test Instruments Co., Ltd.

[Comparative Example 1] Synthesis of Comparative Compound-1

First, 6.06 g of bisphenol A (reagent manufactured by Tokyo Chemical Industry Co., Ltd.), 0.14 g of 4-tert-butylphenol, 160 g of dichloromethane and 6.56 g of triethylamine were added to a 300-ml two-necked round-bottomed flask equipped with a Dimroth condenser and dissolved at room temperature. After cooling the resultant to 5° C., 3.21 g of triphosgene was added thereto in small portions over a period of 1 hour and the resulting mixture was heated to reflux at 40° C. for 1 hour. After the completion of the reaction, the resultant was cooled to room temperature and then washed with 50 ml of ion-exchanged water three times. The resulting reaction mass was added dropwise to 300 g of methanol contained in a 500-ml beaker to allow a polymer to precipitate, which polymer was subsequently recovered by filtration. Then, the thus recovered polymer was washed with 100 ml of methanol three times. Thereafter, the polymer was dried at 90° C. under reduced pressure to obtain the below-described Comparative Compound-1, which is a polycarbonate for comparison, in an amount of 6.33 g (yield=91.8%).

The number-average molecular weight (Mn) of the thus obtained Comparative Compound-1 was determined by the above-described molecular weight measurement method. The result thereof is shown in Table 1.

In addition, as a heat resistance test of the Comparative Compound-1, the 1% weight reduction temperature was measured by the above-described heat resistance test method. The result thereof is shown in Table 1.

Further, a cast film was obtained in the same manner as in Example 1, except that 250 mg of the Comparative Compound-1 was used in place of the Compound No. 1. The thus obtained cast film was subjected to the transparency test and the weather resistance test in the same manner as in Examples. The results thereof are shown in Table 1.

Comparative Example 2

A triazine-based ultraviolet absorber having the structure shown below, 2-(4,6-diphenyl-1,3,5-triazine-2-yl)-5-(hexyl)oxyphenol, was used as Comparative Compound-2. A cast film was obtained in the same manner as in Example 1, except that 250 mg of this Comparative Compound-2 was used in place of the Compound No. 1. The thus obtained cast film was subjected to the transparency test and the weather resistance test in the same manner as in Example 1.

Comparative Example 3

A cast film was obtained in the same manner as in Example 1, except that 237.5 mg of the Comparative Compound-1 and 12.5 mg of the Comparative Compound-2 were used in place of the Compound No. 1. The thus obtained cast film was subjected to the transparency test and the weather resistance test in the same manner as in Examples.

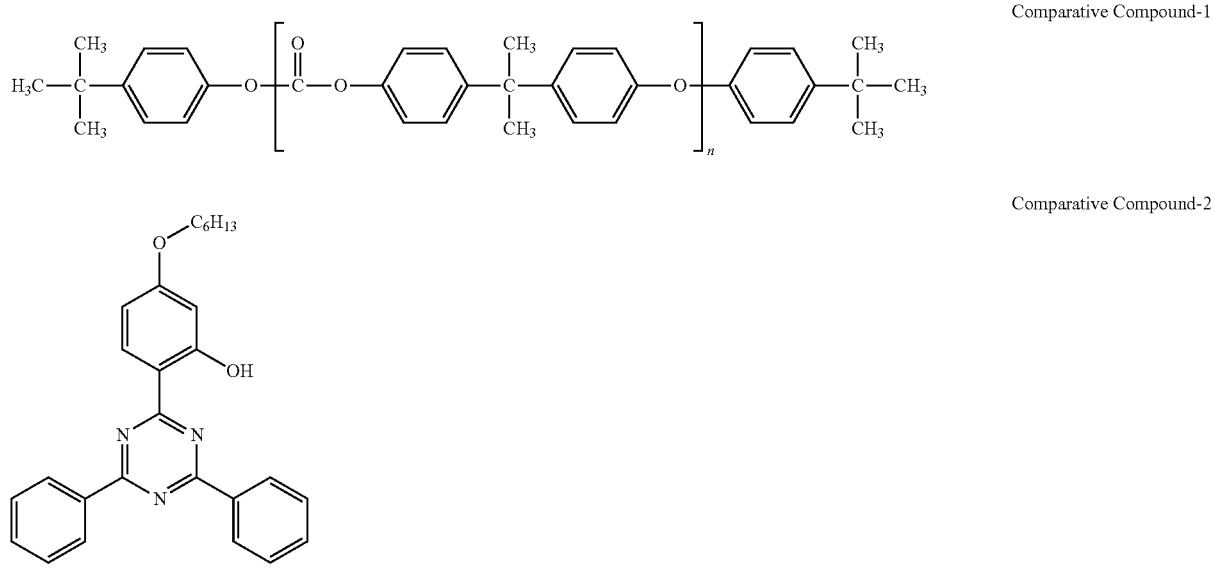

Comparative Compound-1

Comparative Compound-2

TABLE 1

|  | Example 1 | Example 2 | Example 3 | Example 4 | Comparative Example 1 | Comparative Example 2 | Comparative Example 3 |
|---|---|---|---|---|---|---|---|
| Number-average molecular weight (Mn) | 10,500 | 10,700 | 10,900 | 15,500 | 11,700 | — | — |
| 1% weight reduction temperature | 369° C. | 379° C. | 374° C. | 386° C. | 375° C. | 300° C. | 300° C. |

TABLE 1-continued

|  |  | Example 1 | Example 2 | Example 3 | Example 4 | Comparative Example 1 | Comparative Example 2 | Comparative Example 3 |
|---|---|---|---|---|---|---|---|---|
| Haze value (%) |  | 1.4 | 1.6 | 1.5 | 1.5 | 1.5 | 1.7 | 1.5 |
| Yellowness | 0 hour | 1.6 | 1.7 | 1.6 | 1.5 | 1.3 | 5.5 | 2.5 |
| (Y.I.) | 1,000 hours | 8.4 | 8.6 | 8.5 | 8.5 | 11.5 | 12.5 | 10.0 |
|  | ΔY.I. | 6.8 | 6.9 | 6.9 | 7.0 | 10.2 | 7.0 | 7.5 |

The invention claimed is:

1. An ultraviolet-absorbing polycarbonate represented by the following Formula (1):

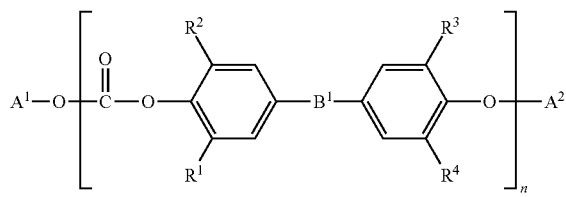

[wherein, n represents an integer of 2 to 300;
$B^1$ represents a linear or branched alkylidene group having 2 to 10 carbon atoms, an alkylene group having 1 to 10 carbon atoms, an arylene group having 6 to 12 carbon atoms, an aryl-substituted alkylene group having 7 to 20 carbon atoms, an aryl-substituted alkylidene group having 8 to 20 carbon atoms, a cycloalkylidene group having 3 to 15 carbon atoms, a cycloalkylene group having 3 to 15 carbon atoms, an alkylidene-arylene-alkylidene group having 10 to 20 carbon atoms, an oxygen atoms, a sulfur atom, a carbonyl group, a sulfonyl group or a direct bond;
$R^1$ to $R^4$ each independently represent a hydrogen atom, a halogen atom, a linear or branched alkyl group having 1 to 12 carbon atoms, a cycloalkyl group having 3 to 8 carbon atoms, an aryl group having 6 to 18 carbon atoms, an alkylaryl group having 7 to 18 carbon atoms or an arylalkyl group having 7 to 18 carbon atoms; and
$A^1$ and $A^2$ each independently represent a group represented by the following Formula (2), a hydrogen atom or a group represented by the following Formula (3), with the proviso that at least either of said $A^1$ and $A^2$ is said group represented by said Formula (2):

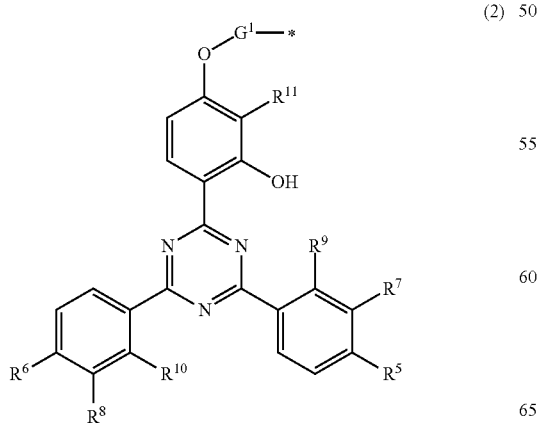

(wherein, $G^1$ represents a linear or branched alkylene group having 1 to 18 carbon atoms which is substituted with a halogen atom, a linear or branched alkyl group having 1 to 18 carbon atoms or a linear or branched alkoxy group having 1 to 18 carbon atoms, or an unsubstituted linear or branched alkylene group having 1 to 18 carbon atoms, said alkylene groups being optionally interrupted by an oxygen atom, a sulfur atom, a carbonyl group, an ester group, an amide group or an imino group and said substitution and interruption optionally existing in combination;
$R^5$ to $R^8$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; or a hydrogen atom, said alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and said substitution and interruption optionally existing in combination;
$R^9$ and $R^{10}$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; a hydrogen atom; or a hydroxy group, said alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and said substitution and interruption optionally existing in combination;

two of said groups represented by said $R^5$, $R^7$ and $R^9$ that are adjacent to each other are optionally linked together to form a 5- to 7-membered ring along with carbon atoms to which these groups are each bound, and two of said groups represented by said $R^6$, $R^8$ and $R^{10}$ that are adjacent to each other are optionally linked together to form a 5- to 7-membered ring along with carbon atoms to which these groups are each bound;

$R^{11}$ represents a hydrogen atom or a linear or branched alkyl group having 1 to 12 carbon atoms; and said Formula (2) is bound to said Formula (1) at the position "*")

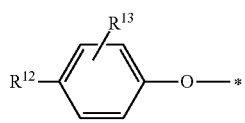

(3)

(wherein, $R^{12}$ represents a hydrogen atom, an alkyl group having 1 to 9 carbon atoms or an arylalkyl group having 7 to 18 carbon atoms; $R^{13}$ represents a hydrogen atom or a methyl group; and said Formula (3) is bound to said Formula (1) at the position "*")].

2. The ultraviolet-absorbing polycarbonate according to claim 1, which is represented by the following Formula (4):

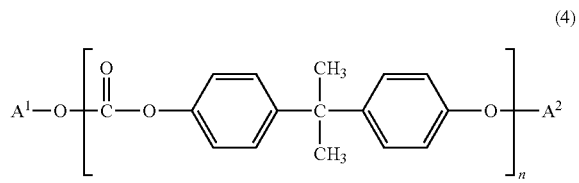

(4)

[wherein, n represents an integer of 2 to 300; and $A^1$ and $A^2$ each independently represent a group represented by the following Formula (5), a hydrogen atom or said group represented by said Formula (3), with the proviso that at least either of said $A^1$ and $A^2$ is said group represented by said Formula (5):

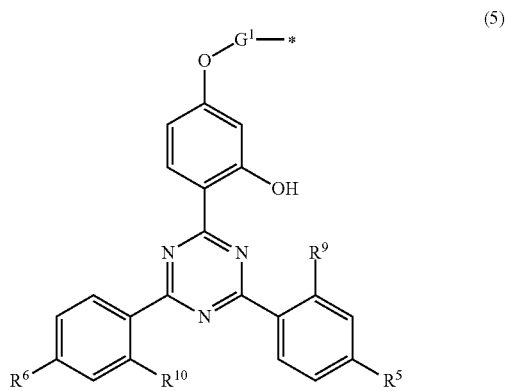

(5)

(wherein, $G^1$ represents a linear or branched alkylene group having 1 to 18 carbon atoms which is substituted with a halogen atom, a linear or branched alkyl group having 1 to 18 carbon atoms or a linear or branched alkoxy group having 1 to 18 carbon atoms, or an unsubstituted linear or branched alkylene group having 1 to 18 carbon atoms, said alkylene groups being optionally interrupted by an oxygen atom, a sulfur atom, a carbonyl group, an ester group, an amide group or an imino group and said substitution and interruption optionally existing in combination;

$R^5$, $R^6$, $R^9$ and $R^{10}$ each independently represent a linear or branched alkyl group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkyl group having 1 to 12 carbon atoms; a linear or branched alkoxy group having 1 to 12 carbon atoms which is substituted with a hydroxy group, a halogen atom, an alkyl group having 1 to 12 carbon atoms or an alkoxy group having 1 to 12 carbon atoms; an unsubstituted linear or branched alkoxy group having 1 to 12 carbon atoms; a cycloalkyl group having 3 to 8 carbon atoms which is substituted with a hydroxy group, a halogen atom, an alkyl group having 1 to 12 carbon atoms or an alkoxy group having 1 to 12 carbon atoms; an unsubstituted cycloalkyl group having 3 to 8 carbon atoms; an alkenyl group having 2 to 8 carbon atoms which is substituted with a hydroxy group, a halogen atom, an alkyl group having 1 to 12 carbon atoms or an alkoxy group having 1 to 12 carbon atoms; an unsubstituted alkenyl group having 2 to 8 carbon atoms; an aryl group having 6 to 18 carbon atoms which is substituted with a hydroxy group, a halogen atom, an alkyl group having 1 to 12 carbon atoms or an alkoxy group having 1 to 12 carbon atoms; an unsubstituted aryl group having 6 to 18 carbon atoms; an alkylaryl group having 7 to 18 carbon atoms which is substituted with a hydroxy group, a halogen atom, an alkyl group having 1 to 12 carbon atoms or an alkoxy group having 1 to 12 carbon atoms; an unsubstituted alkylaryl group having 7 to 18 carbon atoms; an arylalkyl group having 7 to 18 carbon atoms which is substituted with a hydroxy group, a halogen atom, an alkyl group having 1 to 12 carbon atoms or an alkoxy group having 1 to 12 carbon atoms; an unsubstituted arylalkyl group having 7 to 18 carbon atoms; or a hydrogen atom, said alkyl groups, alkoxy groups, cycloalkyl groups, alkenyl groups, aryl groups, alkylaryl groups and arylalkyl groups being optionally interrupted by an oxygen atom, a sulfur atom, a carbonyl group, an ester group, an amide group or an imino group and said substitution and interruption optionally existing in combination; and said Formula (5) is bound to said Formula (4) at the position "*")].

3. An ultraviolet-absorbing polycarbonate resin composition, obtained by adding an additive(s) for synthetic resins to the ultraviolet-absorbing polycarbonate according to claim 1.

4. A weather-resistant thermoplastic resin composition, obtained by adding the ultraviolet-absorbing polycarbonate according to claim 1 to a thermoplastic resin.

5. A method of producing the ultraviolet-absorbing polycarbonate according to claim 1, said method comprising adding a triazine compound represented by the following Formula (7) at the time of performing a polymerization reaction between an aromatic dihydroxy compound represented by the following Formula (6) and a carbonate precursor:

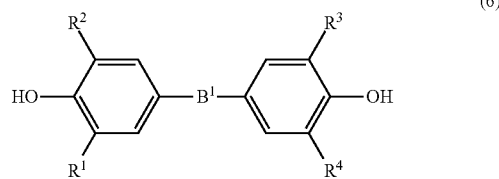

(6)

(wherein, $B^1$ is the same as said $B^1$ of said Formula (1); and $R^1$ to $R^4$ are the same as said $R^1$ to $R^4$ of said Formula (1))

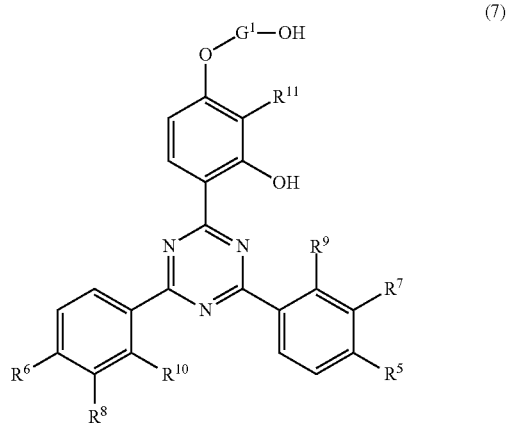

(7)

(wherein, $G^1$ is the same as said $G^1$ of said Formula (2); $R^5$ to $R^8$ are the same as said $R^5$ to $R^8$ of said Formula (2); $R^9$ and $R^{10}$ are the same as said $R^9$ and $R^{10}$ of said Formula (2); and $R^{11}$ is the same as said $R^{11}$ of said Formula (2)).

* * * * *